(12) United States Patent
Hatayama

(10) Patent No.: US 7,085,446 B2
(45) Date of Patent: Aug. 1, 2006

(54) OPTICAL MULTI/DEMULTIPLEXER

(75) Inventor: Hitoshi Hatayama, Kanagawa (JP)

(73) Assignee: Sumitomo Electric Industries, Ltd., Osaka (JP)

( * ) Notice: Subject to any disclaimer, the term of this patent is extended or adjusted under 35 U.S.C. 154(b) by 357 days.

(21) Appl. No.: 10/412,673

(22) Filed: Apr. 14, 2003

(65) Prior Publication Data

US 2004/0018017 A1    Jan. 29, 2004

(30) Foreign Application Priority Data

Apr. 19, 2002   (JP)   ............................. 2002-117966
Apr. 19, 2002   (JP)   ............................. 2002-118094

(51) Int. Cl.
    *G02B 6/28*   (2006.01)
(52) U.S. Cl. .......................................... 385/24; 385/15
(58) Field of Classification Search ................ 385/15, 385/24

See application file for complete search history.

(56) References Cited

U.S. PATENT DOCUMENTS

| | | | |
|---|---|---|---|
| 5,832,155 A * | 11/1998 | Rasch et al. ................... | 385/48 |
| 6,754,411 B1 * | 6/2004 | Ahmadvand et al. ......... | 385/24 |
| 2003/0039461 A1 * | 2/2003 | How Kee Chun et al. . | 385/140 |

FOREIGN PATENT DOCUMENTS

| JP | 64-37507 A | 2/1989 |
|---|---|---|
| JP | 2-126205 A | 5/1990 |
| JP | 2-281239 A | 11/1990 |
| JP | 9-243839 A | 9/1997 |
| JP | 2001-249237 A | 9/2001 |
| JP | 2001-318249 A | 11/2001 |

OTHER PUBLICATIONS

"Integrated four-channel Mach-Zehner multi/demultiplexer fabricated with fabricated with phosphorous doped SIO2 waveguides on Si", Journal of lightwave technology, vol. 6, No. 6, p. 1011-1015 (1988).

(Continued)

*Primary Examiner*—Jennifer Doan
(74) *Attorney, Agent, or Firm*—McDermott Will & Emery LLP

(57) ABSTRACT

An optical multi/demultiplexer having a desirable multi-plexing-and-demultiplexing performance throughout the entire wavelength band for signal transmission, and an optical multiplexer whose multiplexing performance is less susceptible to the shift of the center wavelength and to the fluctuation of the center wavelength due to temperature change and whose optical circuit can be miniaturized. The optical multi/demultiplexer comprises a substrate and an optical circuit formed on the substrate. The optical circuit comprises a circuit having a wavelength dependency, which may be a Mach-Zehnder interferometer (MZI), and a Y-junction. In one aspect of the optical circuit, the Y-junction is connected to one end of each of the two optical waveguides included in an MZI. In another aspect of the optical circuit, the Y-junction is connected to one end of an optical waveguide included in an MZI and to one end of another optical waveguide, whether it is independent or belongs to another MZI.

5 Claims, 10 Drawing Sheets

OTHER PUBLICATIONS

"Flattened pass-band filter of double cascaded Mach-Zehnder Interferometers", proceedings of the 1999 Electronics Society Conference of IEICE, p. 202, No. C-3-96.

"Two-Port Optical Wavelength Circuits Composed of Cascaded Mach-Zehnder Interferometers with Point-Symmetrical Configurations", K. Jinguji, et al; Journal of Lightwave Technology, vol. 14, No. 10, Oct. 1996, p. 2301-2310.

Office Action in Corresponding Japanese Application No. JP 2002-117966 dated Nov. 1, 2005.

* cited by examiner

OPTICAL MULTI/DEMULTIPLEXER

BACKGROUND OF THE INVENTION

1. Field of the Invention

The present invention relates to an optical multi/demultiplexer capable of combining and separating signal lightwaves when used in a wavelength division multiplexing (WDM) transmission system that transmits light carrying a plurality of signals each having a different wavelength over an optical fiber transmission line.

2. Description of the Background Art

In recent years, the highly information-oriented society has been urging researchers and engineers to utilize an optical fiber transmission line for large-capacity communication, such as image transmission, and long-distance communication, such as international communication. Recent rapid increase in communication demands through the Internet has been advancing the development and introduction of the WDM transmission system.

The types of WDM transmission systems includes a dense WDM (DWDM) system, which has a narrow wavelength band for signal transmission, and a coarse WDM (CWDM) system, which has a comparatively broad wavelength band. FIG. 7A is a diagram showing an example of a wavelength grid of the signal lightwave used in the DWDM transmission system. FIG. 7B is a diagram showing an example of a wavelength grid of the signal lightwave used in the CWDM transmission system. In the DWDM transmission system, the spacing $\Delta\lambda$ between the adjacent wavelengths is as narrow as 0.8 nm. On the other hand, in the CWDM transmission system, the spacing $\Delta\lambda$ is as broad as 20 nm, and the entire wavelength band for signal transmission is at least 50 nm. The DWDM transmission system is used for high-speed, large-capacity communication over a long-distance trunk line. The CWDM transmission system is used for communication with comparatively low information density such as that over an access line between a telephone company central office and a customer's premises in an urban area.

The WDM transmission system sometimes requires to combine or separate signal lightwaves carrying a plurality of signals each having a different wavelength for the transmission over an optical transmission line. The types of planar waveguide-type optical circuits capable of combining and separating signal lightwaves include an arrayed waveguide grating (hereinafter referred to as an AWG)-type optical circuit and a Mach-Zehnder interferometer (hereinafter referred to as an MZI)-type optical circuit.

B. H. Verbeek et al. have reported an optical multiplexer incorporating an MZI-type optical circuit in a paper entitled "Integrated four-channel Mach-Zehnder multi/demultiplexer fabricated with phosphorous doped $SiO_2$ waveguides on Si," which is included in the Journal of lightwave technology, Vol. 6, No. 6, p. 1011 (1988). The optical multiplexer combines four signal lightwaves with an optical circuit in which an optical-circuit stage having one asymmetrical MZI and another optical-circuit stage having two asymmetrical MZIs are cascaded.

In such an optical multiplexer, when the number of signal lightwaves to be combined is increased, the size of the optical circuit inevitably increases. To combine eight signal lightwaves, yet another optical-circuit stage having four MZIs must be additionally cascaded (the total number of MZIs is seven). In the optical multiplexer, the spectral line shape of the loss performance is comparatively narrow after the signal lightwaves are combined. As a result, the multiplexing performance tends to be affected by the shift of the center wavelength due to the variations in the production of the optical circuit and by the fluctuation of the center wavelength due to temperature change.

Manabu Oguma et al. have reported an optical multi/demultiplexer in which MZIs are cascaded in two stages in a paper entitled "Flattened pass-band filter of double cascaded Mach-Zehnder interferometers," which is included in the proceedings of the 1999 Electronics Society Conference of IEICE (The Institute of Electronics, Information and Communication Engineers of Japan)(p. 202, number C-3-96). When an optical multi/demultiplexer incorporating a single-stage MZI is used, the spectral line shape of the loss performance shows a Gaussian distribution. Consequently, fluctuation of the wavelength of the signal lightwave varies the multiplexing-and-demultiplexing performance. To cope with this problem, the optical multi/demultiplexer reported by Manabu Oguma et al. uses MZIs cascaded in two stages. This structure flattens the spectral line shape in the vicinity of the minimum value of the loss performance to suppress the variations of the multiplexing-and-demultiplexing performance.

Conventional optical multi/demultiplexers are intended to use mainly in the DWDM transmission system. Consequently, optical multi/demultiplexers have mainly been developed for the use in a comparatively narrow wavelength band, such as the C-band (1530 to 1565 nm) or the L-band (1570 to 1610 nm). However, it is considered that optical multi/demultiplexers will also be applied to communications systems with relatively low information density by using the CWDM transmission system. Accordingly, it is required to develop an optical multi/demultiplexer suitable for this application.

In the CWDM transmission system, the wavelength spacing between the adjacent channels in the wavelength band is broad. Therefore, even when the oscillating wavelength of a laser or the center wavelength of each channel to be combined or separated by an optical multi/demultiplexer is shifted to a certain extent due to temperature change or another cause, this shift can be tolerated in this system. This advantage eliminates the temperature controller for maintaining the temperature constant, and widens the specified allowable limits of the wavelength. As a result, low-cost optical components can be used. On the other hand, because the entire wavelength band for signal transmission is broad, the difference in the multiplexing-and-demultiplexing performance between channels tends to be increased.

For example, in the case of an optical multi/demultiplexer employing the AWG-type optical circuit, the depth of focus of the slab-type waveguide differs with the wavelength. This difference causes the difference in the multiplexing-and-demultiplexing performance between channels. With an optical multi/demultiplexer employing the MZI-type optical circuit, the optical coupling ratio at the directional coupler of the MZI differs with the wavelength. Consequently, as the wavelength of the signal lightwave deviates from the designed center wavelength, the multiplexing-and-demultiplexing performance deteriorates and falls away from the desired performance.

SUMMARY OF THE INVENTION

An object of the present invention is to offer an optical multi/demultiplexer having a desirable multiplexing-and-demultiplexing performance throughout the entire wavelength band for signal transmission. Another object is to offer an optical multiplexer whose multiplexing performance is less susceptible to the shift of the center wavelength and to the fluctuation of the center wavelength due to temperature change and whose optical circuit can be miniaturized.

According to the present invention, the foregoing object is attained by offering an optical multi/demultiplexer comprising a substrate and an optical circuit formed on the substrate, in which the optical circuit comprises (a) a circuit having a wavelength dependency and (b) a Y-junction. The circuit having a wavelength dependency may be an MZI.

According to one aspect of the present invention, the MZI comprises:
(a) at least three directional couplers;
(b) a first optical waveguide whose one end is a first input/output end; and
(c) a second optical waveguide whose one end is a second input/output end and which is optically coupled with the first optical waveguide through the at least three directional couplers.

The optical circuit further comprises a third optical waveguide whose one end is a third input/output end. The Y-junction is connected to other components such that:
(a) its one side is connected to both the other end of the first optical waveguide and the other end of the second optical waveguide; and
(b) its other side is connected to the other end of the third optical waveguide.

The at least three directional couplers may be a first directional coupler, a second directional coupler, and a third directional coupler provided in this order from the first and second input/output ends toward the Y-junction.

A second arm waveguide section represents the waveguide section composed of the first and second optical waveguides lying between the second directional coupler and the third directional coupler. An optical-path difference, ΔL2, in the second arm waveguide section may have a magnitude of $\lambda/1.45$ or less, where $\lambda$ is one of the wavelengths in the entire wavelength band for signal transmission. A first arm waveguide section represents the waveguide section composed of the first and second optical waveguides lying between the first directional coupler and the second directional coupler. An optical-path difference, ΔL1, in the first arm waveguide section may have a magnitude of 8.62 $(\mu m^{-1}) \times \lambda^2$ or more and not more than 137.93 $(\mu m^{-1}) \times \lambda^2$, where $\lambda$ represents the same as before. A third arm waveguide section represents the waveguide section composed of the first and second optical waveguides lying between the third directional coupler and the Y-junction. An optical-path difference, ΔL3, in the third arm waveguide section may have a magnitude of 4.31 $(\mu m^{-1}) \times \lambda^2$ or more and not more than 68.97 $(\mu m^{-1}) \times \lambda^2$, where $\lambda$ represents the same as before.

The optical circuit may further comprise at least one cascaded optical-circuit stage comprising at least one optical circuit. In this case, the or each optical circuit in the or each optical-circuit stage comprises:
(a) at least three directional couplers;
(b) a first optical waveguide whose one end is a first input/output end;
(c) a second optical waveguide whose one end is a second input/output end and which is optically coupled with the first optical waveguide through the at least three directional couplers;
(d) a third optical waveguide whose one end is a third input/output end; and
(e) a Y-junction that is connected to other components such that:
(e1) its one side is connected to both the other end of the first optical wave guide and the other end of the second optical waveguide; and
(e2) its other side is connected to the other end of the third optical waveguide.

According to another aspect of the present invention, the MZI comprises:
(a) at least two directional couplers;
(b) a first optical waveguide whose one end is a first input end; and
(c) a second optical waveguide whose one end is a second input end and which is optically coupled with the first optical waveguide through the at least two directional couplers.

Thus, the MZI forms a first optical-circuit section. The optical circuit further comprises:
(a) a second optical-circuit section comprising a third optical waveguide whose one end is a third input end; and
(b) an output optical waveguide whose one end is an output end.

The Y-junction is connected to other components such that:
(a) its one side is connected to both the other end of the first or second optical waveguide and the other end of the third optical waveguide; and
(b) its other side is connected to the other end of the output optical waveguide.

The second optical-circuit section may further comprise:
(a) at least two directional couplers; and
(b) a fourth optical waveguide whose one end is a fourth input end and which is optically coupled with the third optical waveguide through the at least two directional couplers.

In this case, the third optical waveguide, the fourth optical waveguide, and the at least two directional couplers constitute another MZI. The optical circuit may further comprise a third optical-circuit section comprising:
(a) at least two directional couplers;
(b) a fifth optical waveguide whose one end is a fifth input end; and
(c) a sixth optical waveguide whose one end is a sixth input end and which is optically coupled with the fifth optical waveguide through the at least two directional couplers.

In this case, the fifth optical waveguide, the sixth optical waveguide, and the at least two directional couplers constitute yet another MZI; and the third optical-circuit section is connected to at least one of the first input end and the second input end.

DETAILED DESCRIPTION OF THE INVENTION

Figure 1:
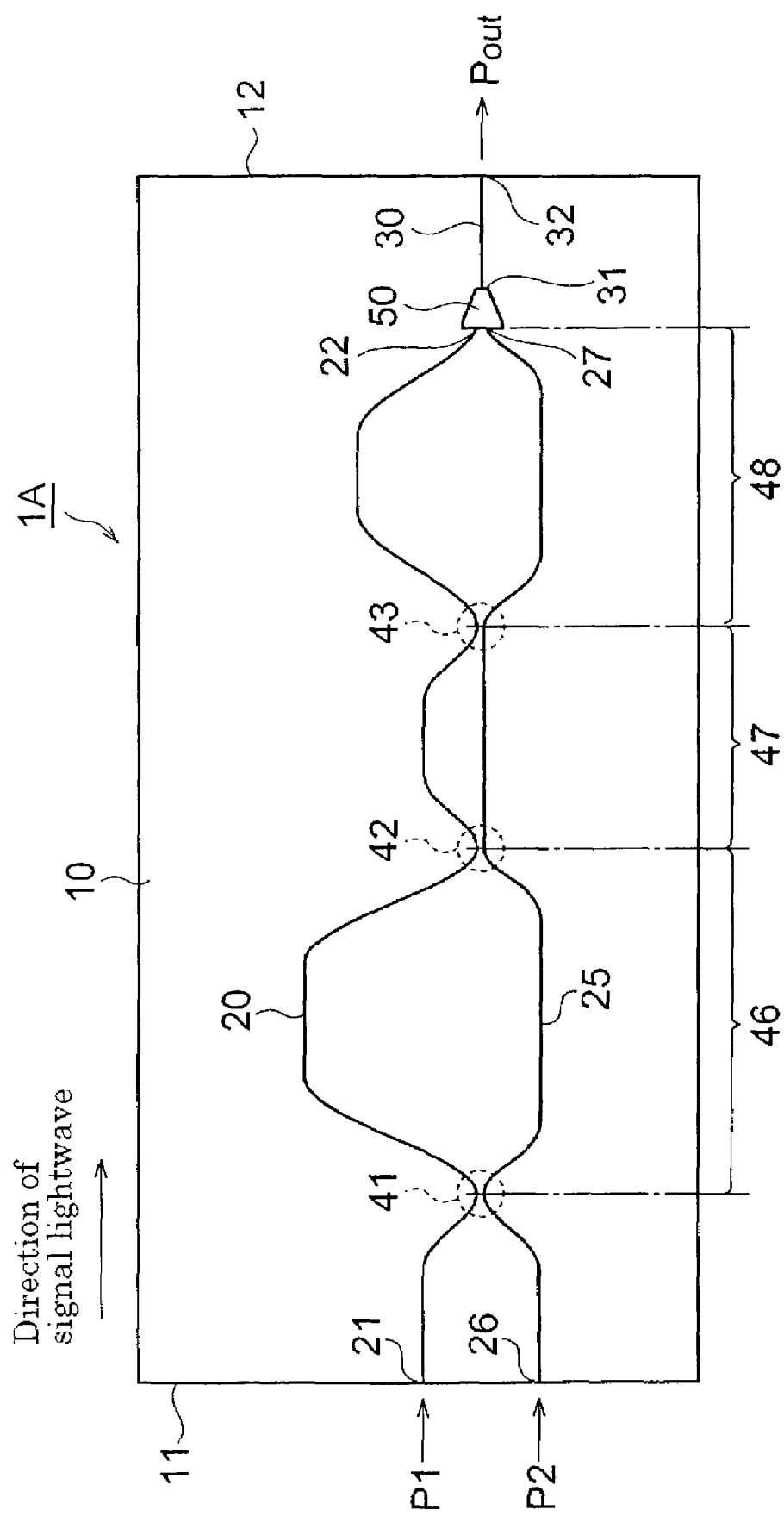
FIG. 1 is a schematic diagram illustrating an embodiment of an optical multi/demultiplexer according to one aspect of the present invention.

Embodiments of the present invention are explained below by referring to the accompanying drawings. In the drawings, the same number refers to the same part to avoid duplicated explanation. The ratios of the dimensions in the drawings do not necessarily coincide with the explanation.

FIG. 1 is a schematic diagram illustrating an embodiment of an optical multi/demultiplexer according to one aspect of the present invention. An optical multi/demultiplexer 1A comprises a substrate and an optical circuit formed on the substrate. The optical multi/demultiplexer 1A is capable of combining and separating signal lightwaves in the WDM transmission system. For the sake of convenience, in the following explanations of the structure of the optical circuit in terms of the aspects such as the input or output of the signal lightwave into or from the optical circuit, the travelling direction of the signal lightwave is mainly in accordance with the direction when the optical multi/demultiplexer is used as an optical multiplexer.

When the optical multi/demultiplexer 1A is used as an optical multiplexer, the travelling direction of the signal lightwave is shown by an arrow in FIG. 1. In this case, the left-side end face of the substrate 10 is an input end face 11, and the right-side end face is an output end face 12. The optical circuit comprises a first optical waveguide 20, a second optical waveguide 25, a Y-junction 50, and a third optical waveguide 30 placed on the substrate 10 in this order from the input end face 11 to the output end face 12 (the first and second optical waveguides are juxtaposed).

The first optical waveguide 20 is provided with a first input end 21 on the input end face 11 and an output end 22 at the input side (one side) of the Y-junction 50. The first input end 21 is a first input end ("a first input/output end" when exactly expressed as an optical multi/demultiplexer; the same is applied to the following expressions) for entering a signal lightwave into the optical multi/demultiplexer 1A. The first optical waveguide 20 is provided with three directional couplers, that is, a first directional coupler 41, a second directional coupler 42, and a third directional coupler 43 placed in this order from the first input end 21 toward the output end 22.

The second optical waveguide 25 is provided with a second input end 26 on the input end face 11 and an output end 27 at the input side (one side) of the Y-junction 50. The second input end 26 is a second input end (a second input/output end) for entering another signal lightwave into the optical multi/demultiplexer 1A. The second optical waveguide 25 is optically coupled with the first optical waveguide 20 through the first to third directional couplers 41 to 43. The first and second optical waveguides 20 and 25 and the first to third directional couplers 41 to 43 constitute an MZI.

A first arm waveguide section 46 comprises the first and second optical waveguides 20 and 25 lying between the first directional coupler 41 and the second directional coupler 42, and has an optical-path difference of $\Delta L1$. Similarly, a second arm waveguide section 47 comprises those lying between the second directional coupler 42 and the third directional coupler 43, and has an optical-path difference of $\Delta L2$. The third arm waveguide section 48 comprises those lying between the third directional coupler 43 and the Y-junction 50, and has an optical-path difference of $\Delta L3$.

The third optical waveguide 30 is provided with an input end 31 at the output side (the other side) of the Y-junction 50 and an output end 32 on the output end face 12. The Y-junction 50 is an optical junction having a Y-shaped optical-waveguide structure.

Signal lightwaves entering the first and second input ends 21 and 26 have a different wavelength. They are combined by the MZI, which comprises the first and second optical waveguides 20 and 25 and the first to third directional couplers 41 to 43, and the Y-junction 50. The combined signal lightwave emerges from the output end 32.

The optical multi/demultiplexer 1A can be used as an optical demultiplexer by reversing the travelling direction of the signal lightwave shown by the arrow in FIG. 1. More specifically, a combined signal lightwave carrying signals each having a different wavelength enters the output end 32, travels over the third optical waveguide 30, and enters the Y-junction 50. The combined signal lightwave is separated by the Y-junction 50 and the MZI. The separated signal lightwaves emerge from the first and second input ends 21 and 26, respectively.

The optical multi/demultiplexer 1A makes it possible to desirably predetermine or control the multiplexing-and-demultiplexing performance of the signal lightwave. More specifically, the adjusting of the optical-path differences $\Delta L1$ to $\Delta L3$ can control the multiplexing-and-demultiplexing performance of the signal lightwave and its wavelength dependency so that desirable performances can be attained.

Whereas the optical coupling ratio varies with the wavelength in the directional coupler, the optical coupling ratio and separating ratio do not vary with the wavelength in the Y-junction, which has a Y-shaped optical-waveguide structure, used in the optical multi/demultiplexer 1A. Furthermore, the Y-junction is easy to process and has small variations in production in comparison with the directional coupler.

Consequently, the optical multi/demultiplexer 1A incorporating the optical circuit comprising the MZI and the Y-junction 50 has reduced wavelength dependency of the multiplexing-and-demultiplexing performance of the signal lightwave. This advantageous feature enables the production of an optical multi/demultiplexer having optical properties applicable to various optical transmission systems including the CWDM transmission system, in which the entire wavelength band for signal transmission is broad and the wavelength spacing between the adjacent channels in the wavelength band is broad.

Figure 8:
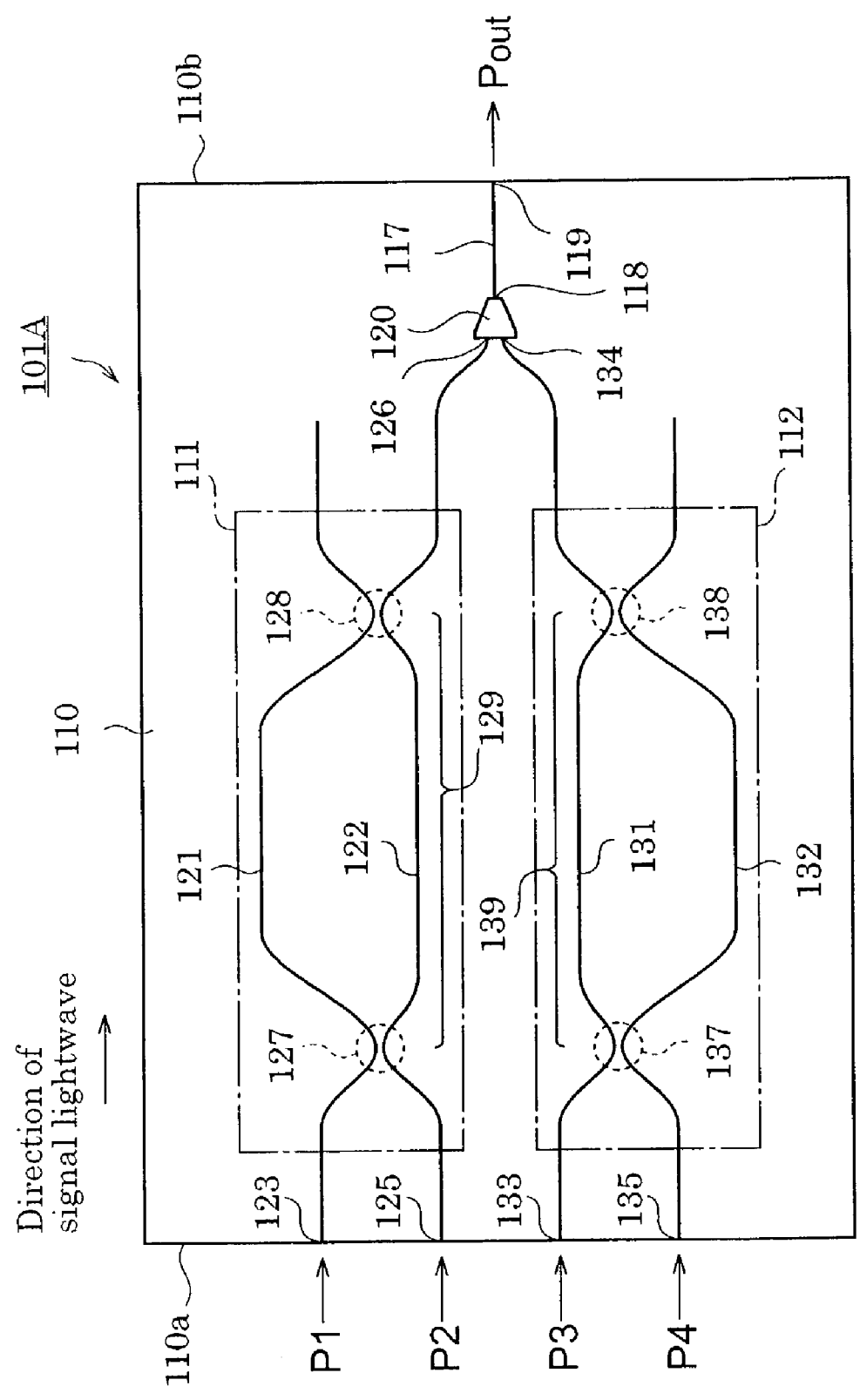
FIG. 8 is a schematic diagram illustrating an embodiment of an optical multiplexer according to another aspect of the present invention.

FIG. 8 is a schematic diagram illustrating an embodiment of an optical multiplexer according to another aspect of the present invention. An optical multiplexer 101A comprises a substrate 110 and an optical circuit formed on the substrate. The optical multiplexer 101A is capable of combining signal lightwaves in the WDM transmission system.

With the optical multiplexer 101A, the travelling direction of the signal lightwave is shown by an arrow in FIG. 8. The left-side end face of the substrate 110 is an input end face 110a for entering signal lightwaves. The right-side end face is an output end face 110b from which a signal lightwave emerges. The optical circuit comprises a first optical-circuit section 111, a second optical-circuit section 112, a Y-junction 120, and an output optical waveguide 117 placed on the substrate 110 in this order from the input end face 110a to the output end face 110b (the first and second optical-circuit sections 111 and 112 are juxtaposed).

The first optical-circuit section 111 comprises two optical waveguides: a first optical waveguide 121 and a second optical waveguide 122. The first optical waveguide 121 is provided with a first input end 123 on the input end face 110a and two directional couplers, that is, a first directional coupler 127 and a second directional coupler 128 placed in this order from the first input end 123. The second optical waveguide 122 is provided with a second input end 125 on the input end face 110a and an output end 126 connected to the input side (one side) of the Y-junction 120. The second optical waveguide 122 is optically coupled with the first optical waveguide 121 through the first and second directional couplers 127 and 128.

A first arm waveguide section 129 comprises the first and second optical wave guides 121 and 122 lying between the first directional coupler 127 and the second directional coupler 128, and has an optical-path difference of $\Delta L1$. The first and second optical waveguides 121 and 122 and the first and second directional couplers 127 and 128 constitute a first MZI, which is asymmetrical, in the first optical-circuit section 111.

The second optical-circuit section 112 comprises a third optical waveguide 131 and a fourth optical waveguide 132. The third optical waveguide 131 is formed between a third input end 133 on the input end face 110a and an output end 134 connected to the input side (one side) of the Y-junction 120. The fourth optical waveguide 132 is formed such that its one end is a fourth input end 135 on the input end face 110a. The third optical waveguide 131 is provided with two directional couplers, that is, a first directional coupler 137 and a second directional coupler 138 placed in this order from the third input end 133. The fourth optical waveguide 132 is optically coupled with the third optical waveguide 131 through the first and second directional couplers 137 and 138.

A second arm waveguide section 139 comprises the third and fourth optical waveguides 131 and 132 lying between the first directional coupler 137 and the second directional coupler 138, and has an optical-path difference of $\Delta L2$. The third and fourth optical waveguides 131 and 132 and the first and second directional couplers 137 and 138 constitute a second MZI, which is asymmetrical, in the second optical-circuit section 112.

The output optical waveguide 117 is provided with an input end 118 connected to the output side (the other side) of the Y-junction 120 and an output end 119 on the output end face 110b. The Y-junction 120 is an optical junction having a Y-shaped optical-waveguide structure.

Signal lightwaves P1 and P2 respectively entering the first and second input ends 123 and 125 have a different wavelength. They are combined by the first MZI, pass through the output end 126, and enter the input side of the Y-junction 120. Signal lightwaves P3 and P4 respectively entering the third and fourth input ends 133 and 135 have a different wavelength. They are combined by the second MZI, pass through the output end 134, and enter the input side of the Y-junction 120. The signal lightwave P1+P2 emerging from the first optical-circuit section 111 and the signal lightwave P3+P4 emerging from the second optical-circuit section 112 are further combined by the Y-junction 120, and the combined signal lightwave Pout emerges from the output end 119.

The effect of the optical multiplexer of this embodiment is explained below. The optical multiplexer 101A employs the Y-junction 120 as the optical multiplexing section in the rear stage. The Y-junction has no wavelength dependency of the optical coupling ratio. In other words, it has a broad spectral line shape of the loss performance at the time signal lightwaves are combined. On the other hand, an MZI has a comparatively narrow spectral line shape of the loss performance. Therefore, in comparison with the design in which an MZI is used as the optical multiplexing section in the rear stage, the optical multiplexer 101A has a stable multiplexing performance. More specifically, the multiplexing performance is less affected by the shift of the center wavelength due to the variations in the production of the optical circuit and by the fluctuation of the center wavelength due to temperature change.

Furthermore, the optical multiplexing section using the Y-junction 120 is smaller than that using an MZI-type optical circuit. Consequently, the entire optical circuit can be miniaturized in the optical multiplexer 101A. In addition, the Y-junction 120 is easy to process and has small variations in production in comparison with the MZI-type optical circuit incorporating directional couplers. The optical multiplexer 101A not only has a good multiplexing performance but also can be produced at reduced cost.

In the optical multiplexer 101A, the front-stage optical-circuit section comprises the first and second optical-circuit sections 111 and 112. They are each composed of an MZI-type optical circuit. As shown in FIG. 8, the juxtaposed two MZI-type optical circuits are cascaded with the Y-junction 120 and form the front stage. This structure enables the optical multiplexer 101A to combine four signal lightwaves each having a different wavelength. As described above, its signal lightwave-multiplexing performance is less affected by the shift and fluctuation of the center wavelength. Therefore, the optical multiplexer 101A can be applied to various optical transmission systems including the CWDM transmission system.

The above-described embodiments of the optical multi/demultiplexer are more specifically explained below by focussing attention on the effects and desirable structural conditions. First, the optical performance of the optical multi/demultiplexer 1A shown in FIG. 1 is compared with that of a conventional optical multi/demultiplexer.

Figure 2:
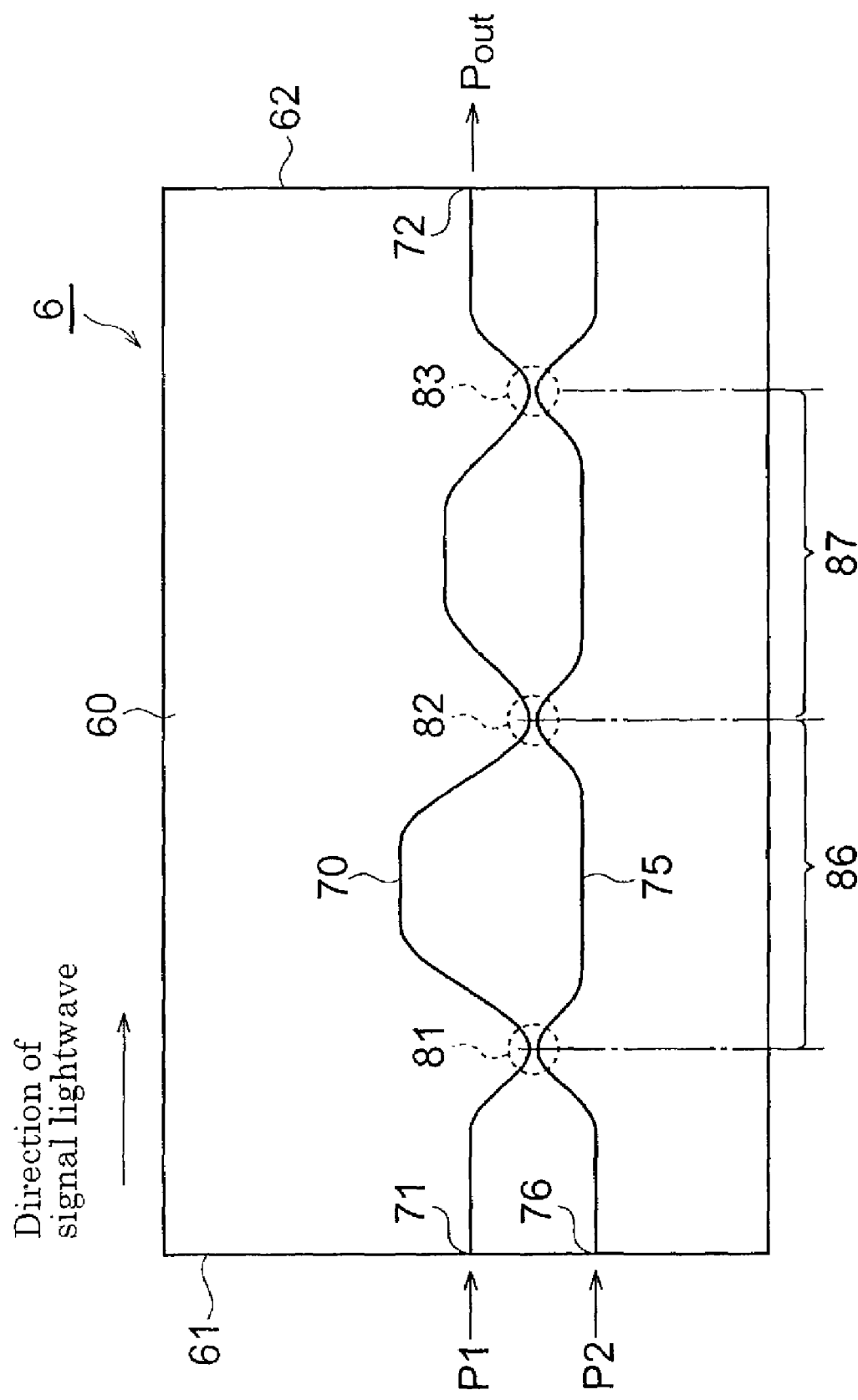
FIG. 2 is a schematic diagram illustrating a conventional optical multi/demultiplexer.

FIG. 2 is a schematic diagram illustrating a conventional optical multi/demultiplexer shown as a comparative example against the optical multi/demultiplexer 1A. An optical multi/demultiplexer 6 comprises two optical waveguides: a first optical waveguide 70 and a second optical waveguide 75. They are formed on a substrate 60 having an input end face 61 and an output end face 62, and are optically coupled with each other through directional couplers 81 to 83. Three directional couplers 81 to 83 and two arm waveguide sections 86 and 87 constitute a two-stage-cascaded MZI-type optical circuit that functions as an optical multi/demultiplexer.

When the optical multi/demultiplexer 6 is used as an optical multiplexer, signal lightwaves are combined as explained below. The first optical waveguide 70 has a first input end 71 through which a signal lightwave P1 enters. The second optical waveguide 75 has a second input end 76 through which a signal lightwave P2 enters. The first optical waveguide 70 has an output end 72 from which a combined signal lightwave Pout emerges. An optical coupling ratio C at each of the directional couplers 81 to 83 and an optical-path difference $\Delta L$ of each of the arm waveguide sections 86 and 87 are properly determined according to the entire wavelength band for signal transmission and the wavelength spacing between the adjacent signal lightwaves of the CWDM transmission system.

Figure 3:
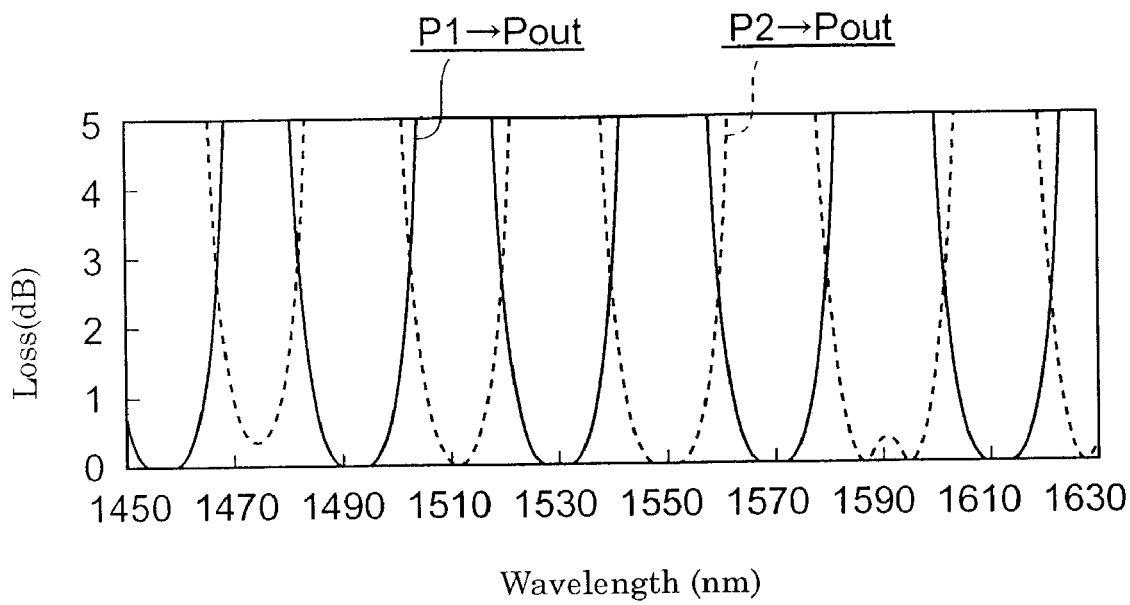
FIG. 3 is a graph showing the multiplexing-and-demultiplexing performance of the optical multi/demultiplexer shown in FIG. 2.

FIG. 3 is a graph showing a calculated result of the multiplexing-and-demultiplexing performance of the optical multi/demultiplexer 6. The axis of abscissas represents the wavelength of the signal lightwave. The axis of ordinates represents the loss of the signal lightwave between the input end and the output end. The solid lines represent the loss performance of the signal lightwave P1; the dotted lines, of the signal lightwave P2. As can be seen from FIG. 3, the loss performance of P2 notably shows that the spectral line shape is sharp without having a flat portion in the short-wavelength region and is characterized by two peaks in the long-wavelength region.

This wavelength dependency of the loss performance is caused mainly by the wavelength dependency of the optical coupling ratio at the directional couplers used as the optical coupling sections in the MZI-type optical circuit used in the optical multi/demultiplexer 6 shown in FIG. 2. The optical coupling ratio at a directional coupler is determined by the optical-power distribution in the cross section of the optical waveguide and by the propagation constant. Therefore, the ratio cannot be independent of the wavelength. As a result, the optical multi/demultiplexer 6 cannot fully exploit the advantageous feature of the CWDM transmission system over the entire wavelength band for signal transmission (the CWDM transmission system allows the shift of the center wavelength to a certain extent).

Figure 4:
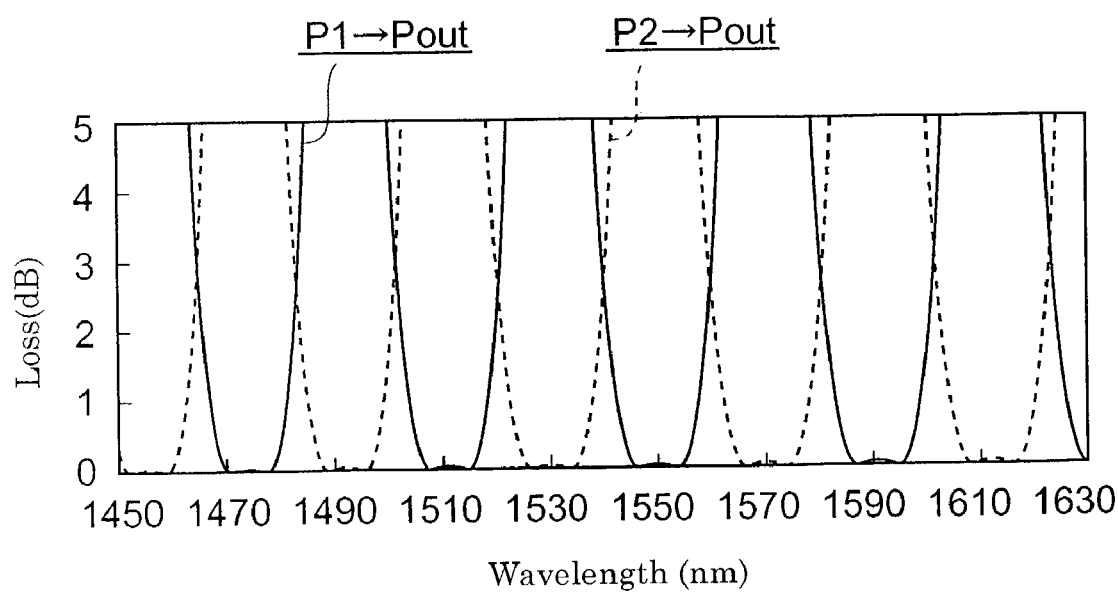
FIG. 4 is a graph showing the multiplexing-and-demultiplexing performance of the optical multi/demultiplexer shown in FIG. 1.

FIG. 4 is a graph showing a calculated result of the multiplexing-and-demultiplexing performance of the optical multi/demultiplexer 1A. When the optical multi/demultiplexer 1A is used as an optical multiplexer, the signal lightwave P1 enters at the first input end 21, the signal lightwave P2 enters at the second input end 26, and the signal lightwave Pout emerges from the output end 32. Optical coupling ratios C1 to C3 at the first to third directional couplers 41 to 43 and the optical-path differences $\Delta L1$ to $\Delta L3$ of the first to third arm waveguide sections 46 to 48 are properly determined according to the entire wavelength band for signal transmission and the wavelength spacing between the adjacent signal lightwaves of the CWDM transmission system. In the graph shown in FIG. 4, the axis of abscissas represents the wavelength of the signal lightwave. The axis of ordinates represents the loss of the signal lightwave between the input end and the output end. The solid lines represent the loss performance of the signal lightwave P1; the dotted lines, of the signal lightwave P2.

As can be seen from FIG. 4, the loss performances of P1 and P2 both show that the spectral line shape has a sufficiently flattened peak portion throughout the wavelength region shown in FIG. 4. FIG. 4 also shows that the spectral line shape has less wavelength dependency than the spectral line shape shown in FIG. 3. These features enable the optical multi/demultiplexer 1A to combine and separate signal lightwaves desirably over an extended range of wavelength. The foregoing features are materialized by the structure of the optical multi/demultiplexer 1A, in which the optical coupling section at the final stage of the MZI-type optical circuit is formed by the Y-junction 50, whose optical coupling ratio has no wavelength dependency.

As described above, the multiplexing-and-demultiplexing performance of the optical multi/demultiplexer 1A can be controlled by properly determining the optical coupling ratios C1 to C3 at the first to third directional couplers 41 to 43 and the optical-path differences $\Delta L1$ to $\Delta L3$ of the first to third arm waveguide sections 46 to 48 in the optical circuit. Desirable conditions for structuring the optical circuit are explained below.

The optical multi/demultiplexer 1A comprises the front stage including the first arm waveguide section 46, the intermediate stage including the second arm waveguide section 47, and the rear stage including the third arm waveguide section 48. The MZI in the intermediate stage lying between the MZI in the front stage and the MZI in the rear stage comprises the second arm waveguide section 47 and the second and third directional couplers 42 and 43. It is desirable that the second arm waveguide section 47 have a smaller optical-path difference, $\Delta L2$, between the first and second optical waveguides than the optical-path differences $\Delta L1$ and $\Delta L3$ in the first and third arm waveguide sections 46 and 48. When this structure is employed, the multiplexing-and-demultiplexing performance of the optical multi/demultiplexer 1A can become independent of wavelength as the entire optical circuit by adjusting the optical coupling ratio together with its wavelength dependency of the MZI in the intermediate stage as an optical coupling section.

Figure 5:
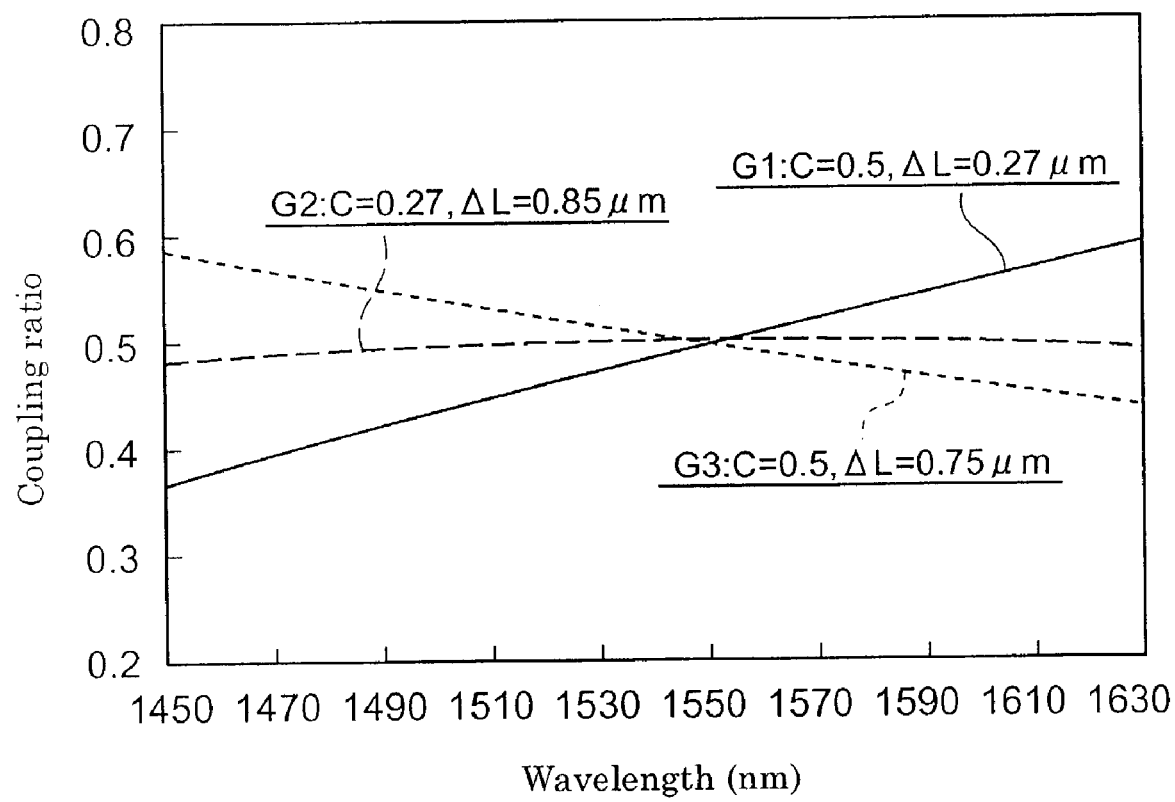
FIG. 5 is a graph showing the wavelength dependency of the optical coupling ratio in an MZI.

FIG. 5 is a graph showing the wavelength dependency of the optical coupling ratio in an MZI. In this case, the MZI has a single-stage structure, composed of directional couplers and an arm waveguide section, as an optical coupling section. The variation of the optical coupling ratio in the MZI was calculated by changing the optical coupling ratio C of the directional couplers and the optical-path difference $\Delta L$ of the arm waveguide section.

In the graph shown in FIG. 5, the axis of abscissas represents the wavelength of the signal lightwave entering the MZI, and the axis of ordinates represents the optical coupling ratio. The curve G1 plotted by a solid line shows the wavelength dependency of the optical coupling ratio when the combination of C=0.5 and $\Delta L$=0.27 μm is adopted. The curve G2 plotted by a broken line shows the wavelength dependency of the optical coupling ratio when the combination of C=0.27 and $\Delta L$=0.85 μm is adopted. The curve G3 plotted by a dotted line shows the wavelength dependency of the optical coupling ratio when the combination of C=0.5 and $\Delta L$=0.75 μm is adopted.

As can be seen from the curves G1 to G3, the optical coupling ratio and its wavelength dependency of an MZI can be controlled by adjusting the optical coupling ratio C of the directional couplers and the optical-path difference $\Delta L$ of the arm waveguide section included in the MZI.

However, if the optical-path difference $\Delta L$ is excessively large, the optical coupling ratio of the MZI shows a sinusoidal wavelength dependency with short periodicity. To avoid this phenomenon, in the optical multi/demultiplexer 1A shown in FIG. 1, it is desirable that the optical-path difference $\Delta L2$ at the second arm waveguide section 47 in the intermediate stage have a magnitude that produces an effective optical-path difference (neff·ΔL2) not more than one wavelength λ (for example, the center wavelength $\lambda_0$) in the entire wavelength band for signal transmission. Here, the term "neff" denotes the effective refractive index of the core of the optical waveguide. The above procedure makes it possible to desirably control the wavelength dependency of the multiplexing-and-demultiplexing performance of the optical multi/demultiplexer 1A as a whole by adjusting the MZI in the intermediate stage including the second arm waveguide section 47.

More specifically, when a quartz-based glass waveguide is used, the magnitude of "neff" is 1.45. In this case, it is desirable that the optical-path difference ΔL2 at the second arm waveguide section 47 be not more than λ/neff=λ/1.45. For example, when the signal lightwave has a wavelength of λ=1.55 μm, it is desirable that the optical-path difference ΔL2 be not more than 1.55/1.45≈1.1 μm.

With reference to the multiplexing-and-demultiplexing performance of the optical multi/demultiplexer 1A shown in FIG. 1, the graph of the loss performance shown in FIG. 4 is obtained by the calculation on an optical-circuit model that has the following figures when the signal lightwave wavelength has a wavelength of λ=1.55 μm:

(a) optical coupling ratio at the first, second, and third directional couplers 41, 42, and 43:
C1=0.1, C2=0.7, and C3=0.3

(b) optical-path difference at the first, second, and third arm waveguide sections 46, 47, and 48:
ΔL1=81.8 μm, ΔL2=0.86 μm, and ΔL3±40.9 μm.

With reference to the multiplexing-and-demultiplexing performance of the optical circuit as a whole in the optical multi/demultiplexer 1A, the optical performance can be controlled by adjusting the optical-path differences ΔL1 and ΔL3. For example, the wavelength spacing Δλ between the adjacent channels can be freely determined by adjusting the optical-path differences ΔL1 and ΔL3. In the foregoing optical-circuit model used for the calculation of the multiplexing-and-demultiplexing performance shown in FIG. 4, the wavelength spacing Δλ between the adjacent channels in the wavelength band is determined to be 20 nm. When the wavelength spacing Δλ=5 nm is needed, the optical-path differences are required to be ΔL1=332 μm and ΔL3=166 μm. When the wavelength spacing Δλ=80 nm is needed, the optical-path differences are required to be ΔL1=20.71 μm and ΔL3=10.36 μm.

Generally, for one wavelength λ (for example, the center wavelength $\lambda_0$) in the entire wavelength band for signal transmission, when the optical-path differences at the first and third arm waveguide sections 46 and 48 have the magnitudes of $\Delta L1=\lambda^2/(neff \cdot \Delta \lambda)$ and $\Delta L3=\lambda^2/(2 \cdot neff \cdot \Delta \lambda)$, respectively, the wavelength spacing between the adjacent channels in the wavelength band can be determined to be nearly Δλ.

More specifically, when a quartz-based glass waveguide is used, the magnitude of the effective refractive index "neff" is 1.45 as described above. In this case, the wavelength spacing is determined to be Δλ=5 nm when the optical-path differences are ΔL1=137.93 $(\mu m^{-1}) \times \lambda^2$ and ΔL3=68.97 $(\mu m^{-1}) \times \lambda^2$. Similarly, the wavelength spacing is determined to be Δλ=80 nm when the optical-path differences are ΔL1=8.62 $(\mu m^{-1}) \times \lambda^2$ and ΔL3=4.31 $(\mu m^{-1}) \times \lambda^2$. Furthermore, for the wavelength λ of a signal lightwave, when the optical-path difference at the first arm waveguide section 46 is at least ΔL1=8.62 $(\mu m^{-1}) \times \lambda^2$ and at most ΔL1=137.93 $(\mu m^{-1}) \times \lambda^2$, and when the optical-path difference at the third arm waveguide section 48 is at least ΔL3=4.31 $(\mu m^{-1}) \times \lambda^2$ and at most ΔL3=68.97 $(\mu m^{-1}) \times \lambda^2$, the wavelength spacing of the signal lightwaves to be combined and separated by the optical multi/demultiplexer 1A can be freely determined to be Δλ=5 nm or more and not more than Δλ=80 nm.

Figure 6:
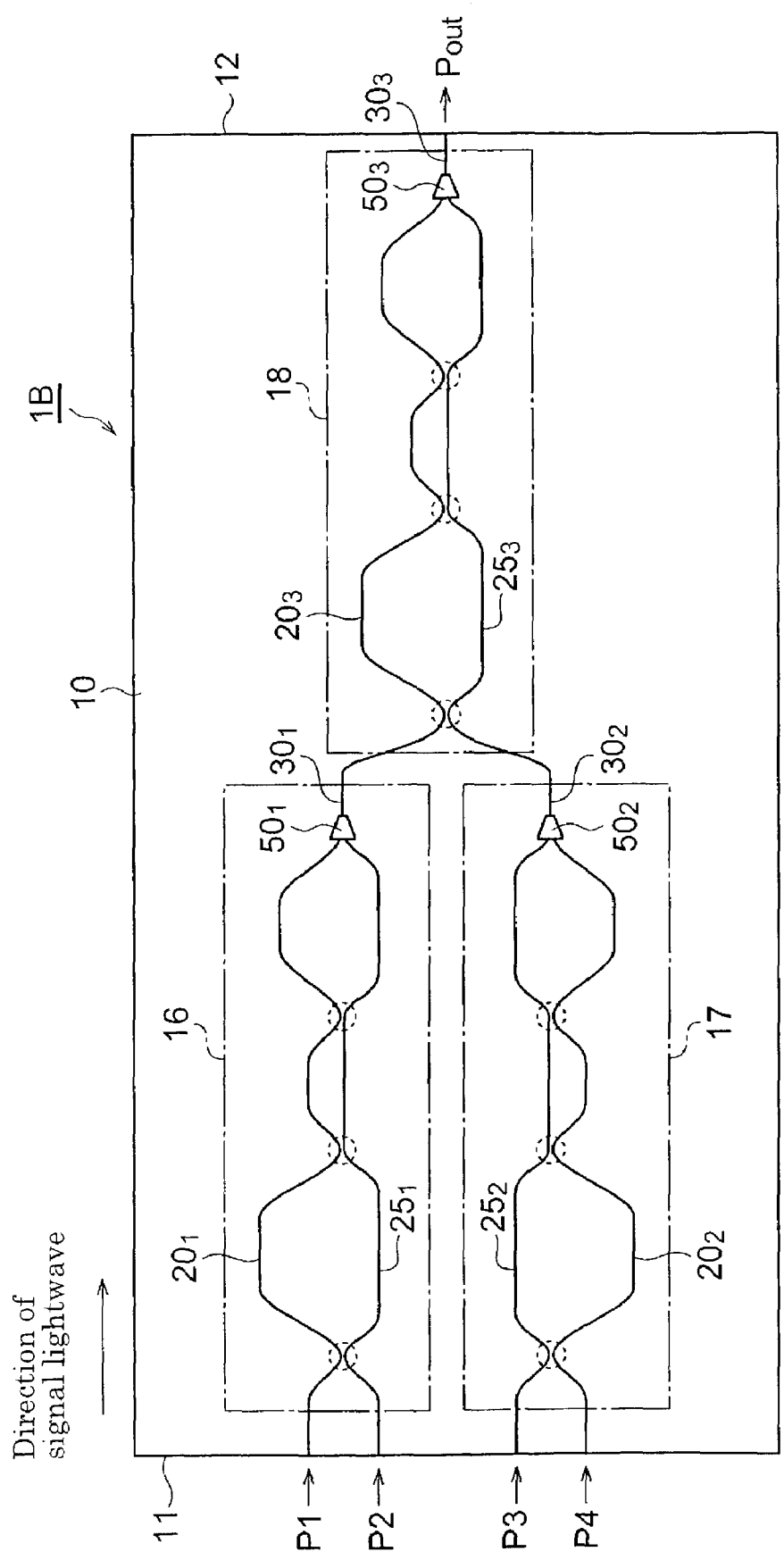
FIG. 6 is a schematic diagram illustrating an embodiment of an optical multi/demultiplexer according to another aspect of the present invention.
Figure 7A:
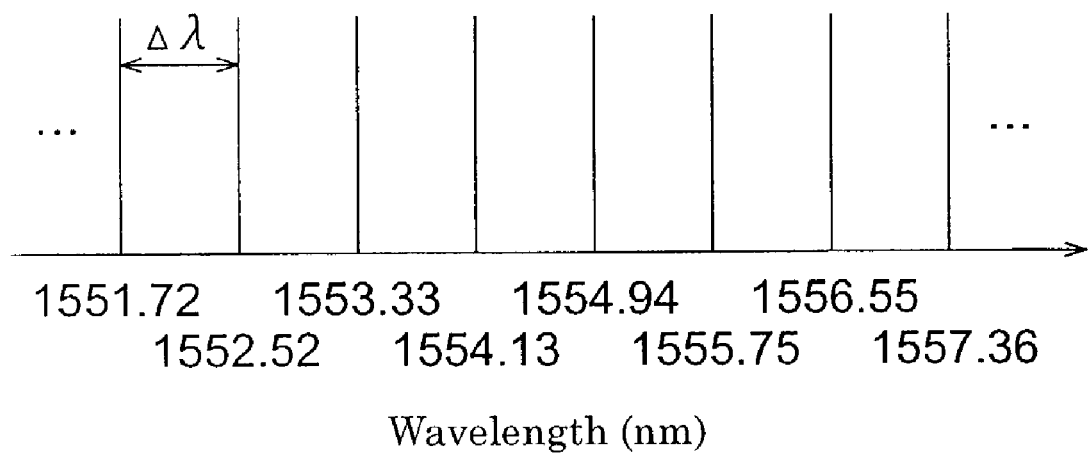
FIG. 7A is a diagram showing an example of a wavelength grid of the signal lightwave used in the DWDM transmission system.
Figure 7B:
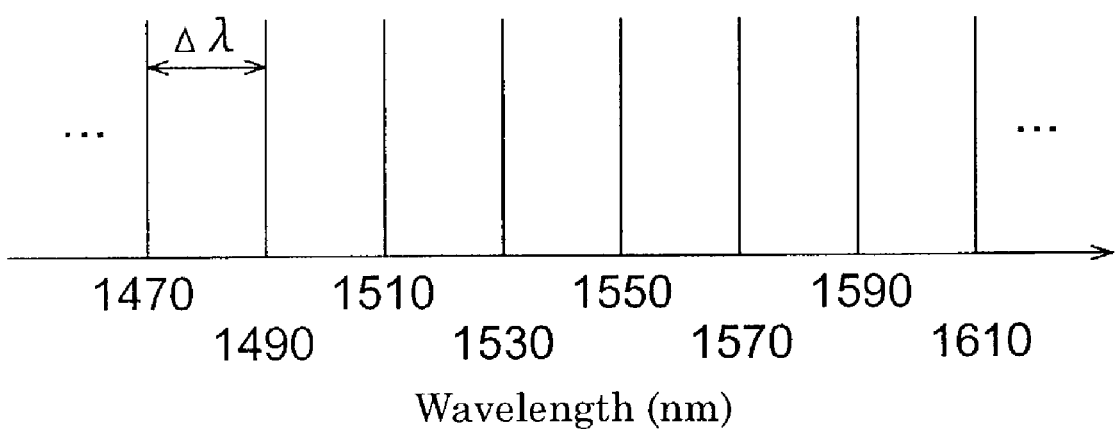
FIG. 7B is a diagram showing an example of a wavelength grid of the signal lightwave used in the CWDM transmission system.

FIG. 6 is a schematic diagram illustrating an embodiment of an optical multi/demultiplexer according to another aspect of the present invention. An optical multi/demultiplexer 1B has a structure in which an optical circuit having the same structure as in the optical multi/demultiplexer 1A is connected to each of the input ends of the optical multi/demultiplexer 1A. The optical multi/demultiplexer 1B comprises a substrate 10 and an optical circuit formed on the substrate 10. When the optical multi/demultiplexer 1B is used as an optical multiplexer, the travelling direction of the signal lightwave is shown by an arrow in FIG. 6. In this case, the left-side end face of the substrate 10 is an input end face 11; the right-side end face, an output end face 12.

Three optical-circuit sections, i.e., a first optical-circuit section 16 to a third optical-circuit section 18, are formed on the substrate 10. Each of them has the same structure as that of the optical circuit of the optical multi/demultiplexer 1A shown in FIG. 1. More specifically, for i=1, 2, and 3, the i-th optical-circuit section 16, 17, or 18 comprises:

(a) an MZI comprises of a first optical waveguide $20_i$ and a second optical waveguide $25_i$;

(b) a Y-junction $50_i$ whose input side is connected with the output ends of the first and second optical waveguides $20_i$ and $25_i$; and (c) a third optical waveguide $30_i$ connected to the output side of the Y-junction $50_i$.

As described above, each of the optical-circuit sections 16, 17, and 18 has the same optical-circuit structure as that used in the optical multi/demultiplexer 1A.

Of the first to third optical-circuit sections 16 to 18, the first and second optical-circuit sections 16 and 17 constitute the front-stage optical-circuit section provided at the side of the input end face 11. The third optical-circuit section 18 constitutes the rear-stage optical-circuit section provided at the side of the output end face 12.

The input ends of the first and second optical waveguides $20_1$ and $25_1$ are provided on the input end face 11. These input ends constitute a first input end and a second input end in the foregoing order for entering signal lightwaves P1 and P2 into the optical multi/demultiplexer 1B. Similarly, the input ends of the second and first optical waveguides $25_2$ and $20_2$ are provided on the input end face 11. These input ends constitute a third input end and a fourth input end in the foregoing order for entering signal lightwaves P3 and P4 into the optical multi/demultiplexer 1B.

The output end of the third optical waveguide 303 is provided on the output end face 12. The output end allows the combined signal lightwave Pout to emerge from the optical multi/demultiplexer 1B. The output end of the third optical waveguide $30_1$ is connected to the input end of the first optical waveguide $20_3$. The output end of the third optical waveguide $30_2$ is connected to the input end of the second optical waveguide $25_3$.

The foregoing structure functions as follows: The signal lightwaves P1 and P2 are combined by the MZI, which comprises the first and second optical waveguide $20_1$ and $25_1$, and the Y-junction $50_1$. The combined signal lightwave P1+P2 emerges from the output end of the third optical waveguide $30_1$. Similarly, the signal lightwaves P3 and P4 are combined by the MZI, which comprises the first and second optical waveguide $20_2$ and $25_2$, and the Y-junction $50_2$. The combined signal lightwave P3+P4 emerges from the output end of the third optical waveguide $30_2$.

The signal lightwave P1+P2 having emerged from the first optical-circuit section 16 enters the first optical waveguide $20_3$. The signal lightwave P3+P4 having emerged from the second optical-circuit section 17 enters the second optical waveguide $25_3$. The signal lightwaves having entered the third optical-circuit section 18 are combined by the MZI, which comprises the first and second optical waveguide $20_3$ and $25_3$, and the Y-junction $50_3$. The combined signal lightwave Pout emerges from the output end of the third optical waveguide $30_3$. As with the optical multi/demultiplexer 1A shown in FIG. 1, the optical multi/demultiplexer 1B can be used as an optical demultiplexer by reversing the travelling direction of the signal lightwave.

As explained above, the optical multi/demultiplexer 1B is capable of combining and separating four signal lightwaves P1 to P4 ($2^2$=4) each having a different wavelength. Generally, when an optical multi/demultiplexer has a structure in which n optical-circuit stages are cascaded such that the first stage has $2^0$ optical circuit, the second stage has $2^1$ optical circuits, the third stage has $2^2$ optical circuits, . . . , and the nth stage has $2^{n-1}$ optical circuits, $2^n$ signal lightwaves each having a different wavelength can be combined or separated. Here, the or each optical circuit comprises a first optical waveguide 20, a second optical waveguide 25, a third optical waveguide 30, and a Y-junction 50. The number of stages "n" can be selected in accordance with the number of channels of the signal lightwaves to be combined or separated.

Figure 9:
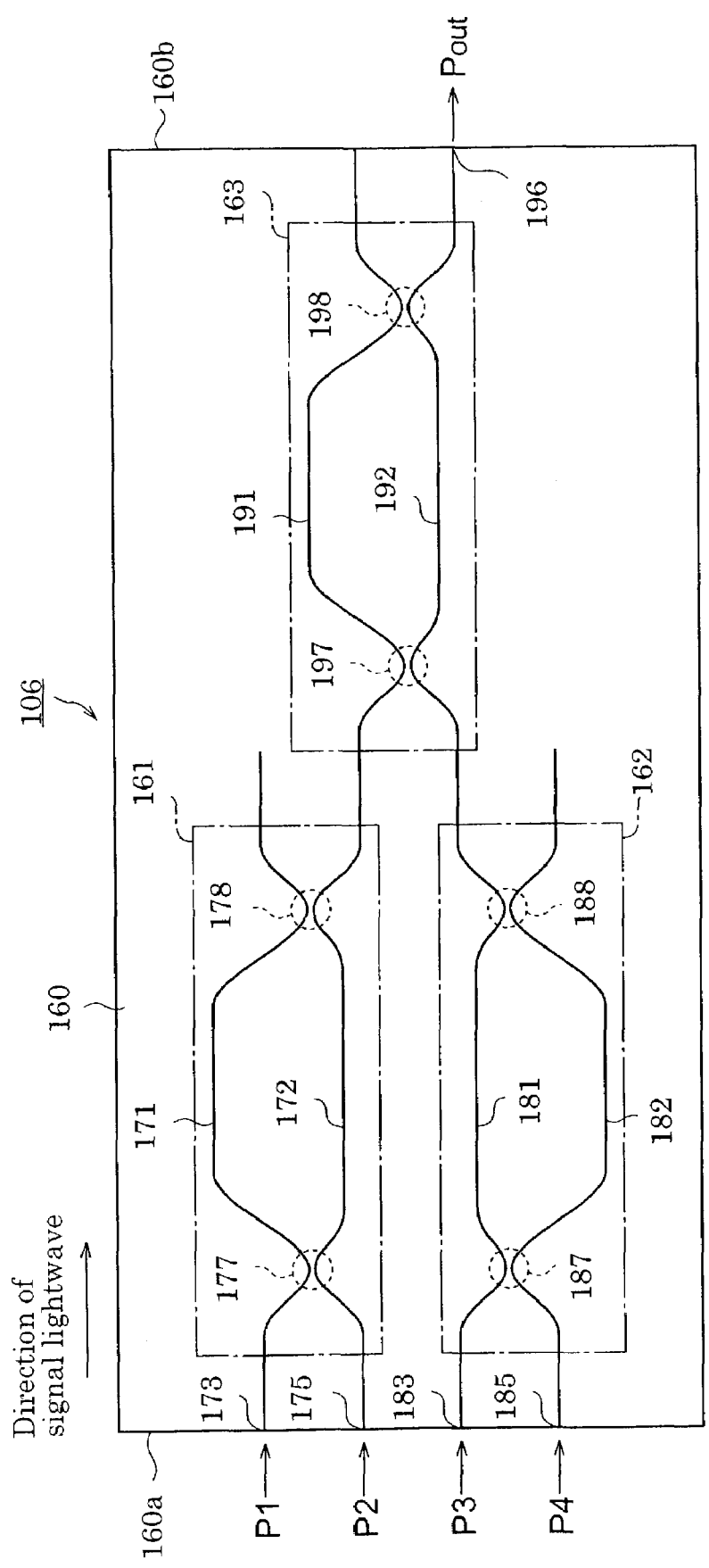
FIG. 9 is a schematic diagram illustrating a conventional optical multiplexer.

Next, the optical multiplexer 101A shown in FIG. 8 is explained by comparing with a conventional optical multiplexer. FIG. 9 is a schematic diagram illustrating a conventional optical multiplexer 106 shown as a comparative example against the optical multiplexer 101A. The optical multiplexer 106 comprises a first optical-circuit section 161, a second optical-circuit section 162, and a third optical-circuit section 163 formed on a substrate 160 having an input end face 160a and an output end face 160b.

The first optical-circuit section 161 has (a) a first optical waveguide 171 whose one end is a first input end 173 through which a signal lightwave P1 enters and (b) a second optical waveguide 172 whose one end is a second input end 175 through which a signal lightwave P2 enters. The first and second optical waveguides 171 and 172 are optically coupled through a first directional coupler 177 and a second directional coupler 178. This structure forms an MZI that combines the signal lightwaves P1 and P2.

The second optical-circuit section 162 has (a) a first optical waveguide 181 whose one end is a third input end 183 through which a signal lightwave P3 enters and (b) a second optical waveguide 182 whose one end is a fourth input end 185 through which a signal lightwave P4 enters. The first and second optical waveguides 181 and 182 are optically coupled through a first directional coupler 187 and a second directional coupler 188. This structure forms an MZI that combines the signal lightwaves P3 and P4.

The third optical-circuit section 163 has (a) a first optical waveguide 191 whose input end is connected to the second optical waveguide 172 of the first optical-circuit section 161 and (b) a second optical waveguide 192 whose input end is connected to the first optical waveguide 181 of the second optical-circuit section 162. The first and second optical waveguides 191 and 192 are optically coupled through a first directional coupler 197 and a second directional coupler 198. This structure forms an MZI that combines the signal lightwave P1+P2 emerging from the first optical-circuit section 161 and the signal lightwave P3+P4 emerging from the second optical-circuit section 162. The combined signal lightwave Pout emerges from an output end 196 of the second optical waveguide 192.

For simplicity, the multiplexing of signal lightwaves is explained by referring to an optical circuit composed of a single-stage MZI. To combine a signal lightwave P1 having a wavelength of $\lambda_1$ and a signal lightwave P2 having a wavelength of $\lambda_2$ with a single-stage MZI-type optical circuit, it is required that the optical-path difference $\Delta L$ between the two optical waveguides constituting the arm waveguide section of the asymmetrical MZI be determined so as to satisfy the following equation:

$$\lambda_2 - \lambda_1 = \lambda_1 \cdot \lambda_2/(2n_g)\Delta L.$$

Here, "$n_g$" denotes the effective refractive index of the core of the optical waveguide. When a quartz-based glass waveguide is used, the magnitude of "$n_g$" is 1.45.

For example, in the single-stage MZI-type optical circuit, when $\lambda_1$=1550 nm, $\lambda_2$=1555 nm, and $n_g$=1.45, the optical-path difference is $\Delta L$=166.224 µm. Similarly, when $\lambda_1$=1550 nm, $\lambda_2$=1560 nm, and $n_g$=1.45, the optical-path difference is $\Delta L$=83.379 µm.

As can be seen from the foregoing equation and the calculated examples, as the wavelength spacing $\lambda_2 - \lambda_1$ between the two signal lightwaves to be combined decreases, the optical-path difference $\Delta L$ required for the MZI increases. Consequently, the length of the chip for the optical circuit increases. In the foregoing calculated examples, for the former example whose wavelength spacing is 5 nm, the chip length is 13.4 mm. For the latter example whose wavelength spacing is 10 nm, the chip length is 11.6 mm. Here, the chip length of the optical circuit is calculated by assuming that the radius of curvature at the curved portions in the optical waveguides included in the optical circuit is R=4 mm.

The optical multiplexer shown in FIG. 9 has a structure in which two juxtaposed MZI-type optical circuits are cascaded with another MZI-type optical circuit, and is capable of combining four signal lightwaves P1 to P4 having wavelengths $\lambda_1$ to $\lambda_4$, respectively. In this structure, when the signal lightwaves to be combined have wavelengths of $\lambda_1$=1540 nm, $\lambda_2$=1545 nm, $\lambda_3$=1550 nm, and $\lambda_4$=1555 nm, the chip length of the entire optical multiplexer 106 is 23.9 mm when measured in a direction of the propagation of the signal lightwave. Such a long chip length increases not only the cost but also the size of the optical circuit. As a result, it is difficult to use this type of optical circuit in an optical communications system.

On the other hand, the optical multiplexer 101A of the present invention shown in FIG. 8 has a chip length of 16.6 mm for the entire optical multiplexer 101A when measured in a direction of the propagation of the signal lightwave. This length is considerably shorter than that of the optical multiplexer 106 of the prior art. The optical multiplexer 101A has a structure in which the first and second optical-circuit sections 111 and 112 are both MZI-type optical circuits, are juxtaposed to each other, and are cascaded with the Y-junction 120. As described above, this type of structure for the optical multiplexer enables the miniaturization and the consequent cost reduction of the optical circuit.

Figure 10:
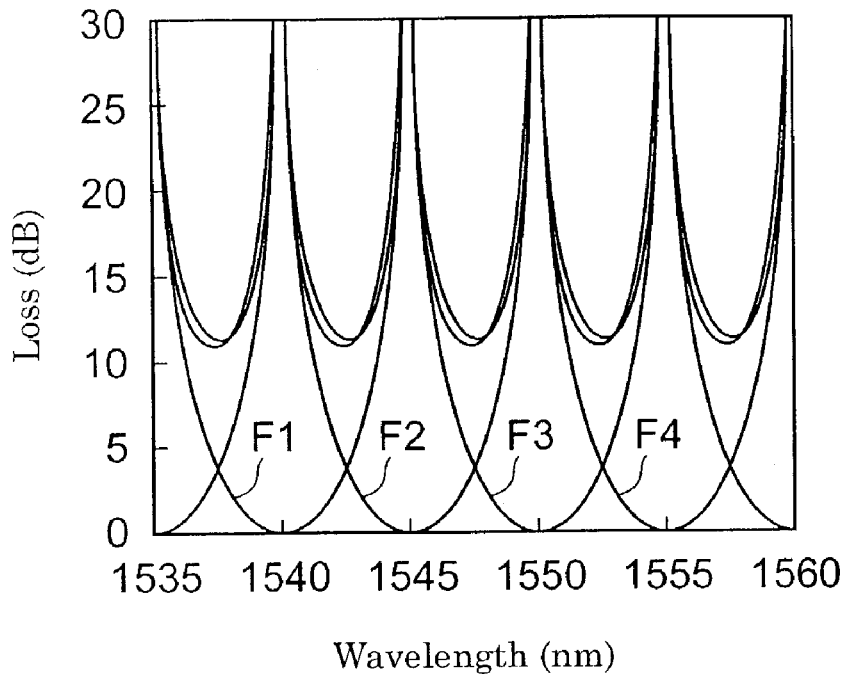
FIG. 10 is a graph showing the multiplexing performance of the optical multiplexer shown in FIG. 9.
Figure 11:
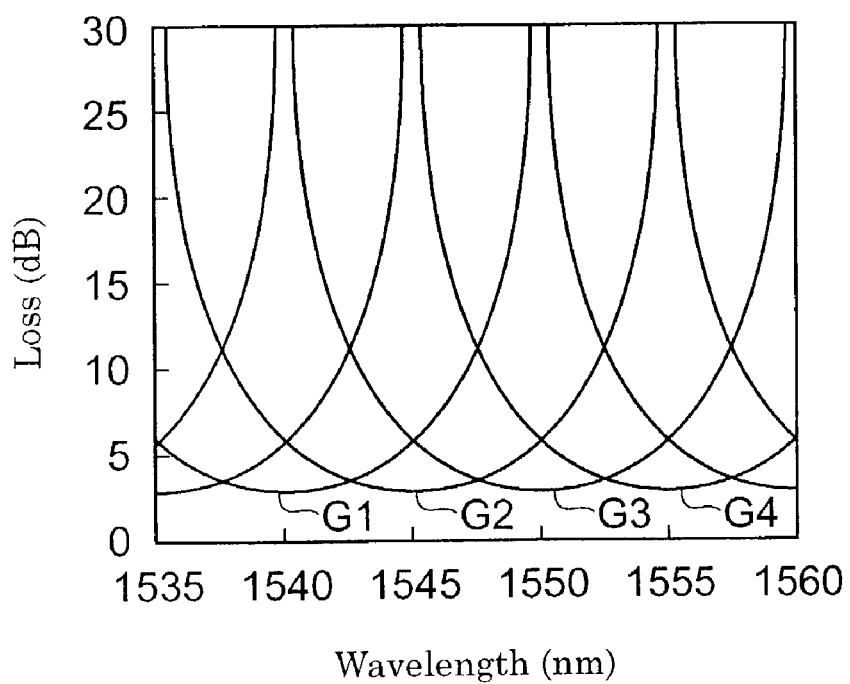
FIG. 11 is a graph showing the multiplexing performance of the optical multiplexer shown in FIG. 8.

Next, the optical performance of the optical multiplexer 101A is compared with that of the optical multiplexer 106. FIG. 10 is a graph showing a calculated result of the multiplexing performance of the optical multiplexer 106. The axis of abscissas represents the wavelength of the signal lightwave. The axis of ordinates represents the loss of the signal lightwave between the input end and the output end. The curves F1 to F4 represent the loss performance of the signal lightwaves P1 to P4, respectively. Similarly, FIG. 11 is a graph showing a calculated result of the multiplexing performance of the optical multiplexer 101A. The axis of abscissas represents the wavelength of the signal lightwave. The axis of ordinates represents the loss of the signal lightwave between the input end and the output end. The curves G1 to G4 represent the loss performance of the signal lightwaves P1 to P4, respectively.

The comparison between the curves in FIG. 10 and FIG. 11 shows that whereas the insertion loss for the optical multiplexer 106 is less than 0.2 dB, the insertion loss for the optical multiplexer 101A is 3.2 dB, which is slightly higher. Next, comparison is performed on the 3-dB bandwidth of the spectral line shape of the loss performance of the channels P1 to P4. Here, the 3-dB bandwidth indicates the bandwidth between the upper and lower wavelength limits within which the loss increases by at most 3 dB from the minimum value. According to this comparison, whereas the 3-dB band width for the conventional optical multiplexer 106 is 4.4 nm, the 3-dB band width for the optical multiplexer 101A is 9.9 nm, which is more than two times as wide as that for the optical multiplexer 106.

As described above, in comparison with the conventional optical multiplexer 106, the optical multiplexer 101A using the Y-junction 120 has a wider spectral line shape of the loss performance when signal lightwaves are combined. Therefore, the optical multiplexer 101A can manifest a stable multiplexing performance even when the center wavelength shifts due to the variations in the production of the optical circuit or even when the center wavelength fluctuates due to the change in environmental temperature and other conditions.

Figure 12:
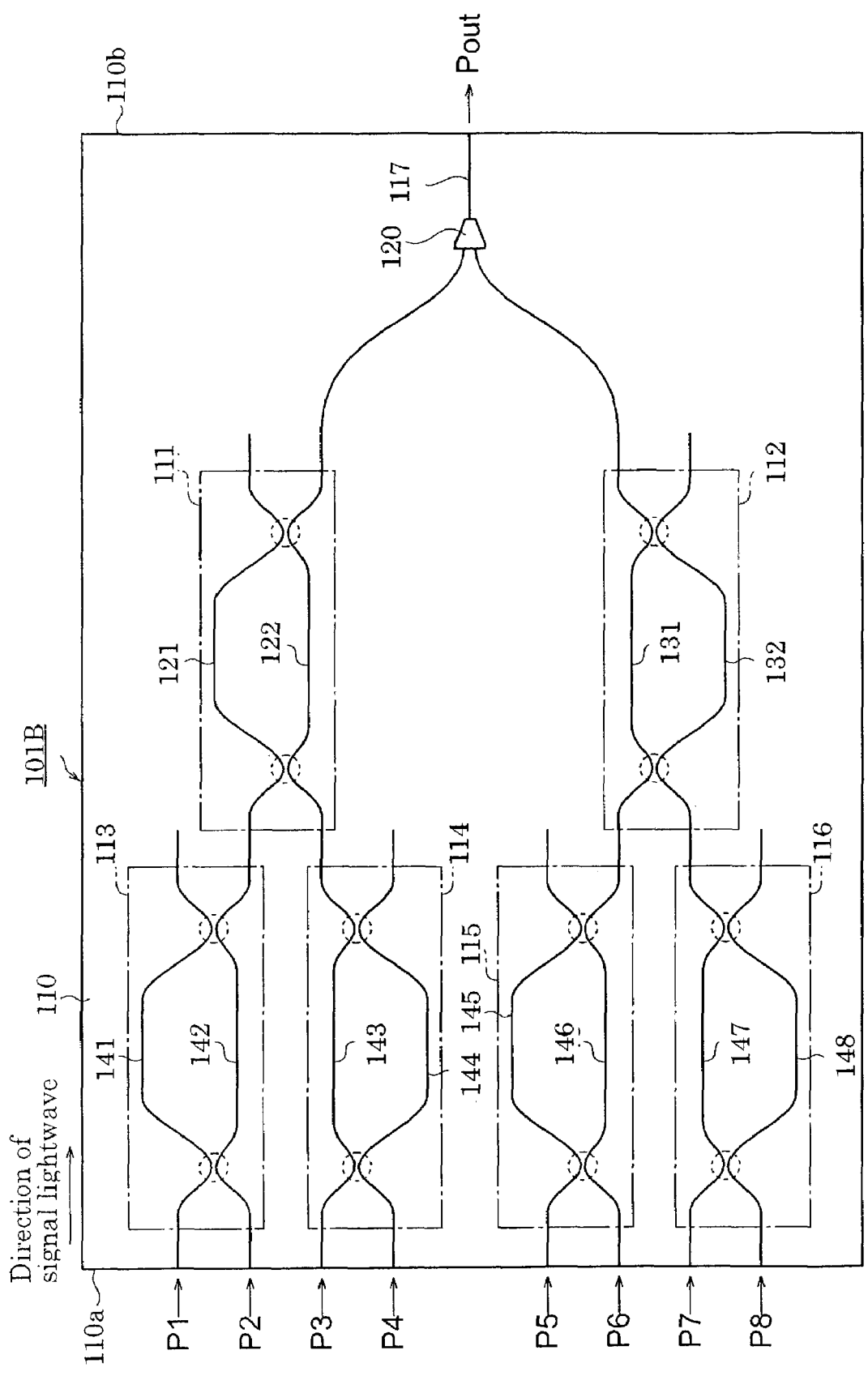
FIG. 12 is a schematic diagram illustrating an embodiment of an optical multiplexer according to another aspect of the present invention.

FIG. 12 is a schematic diagram illustrating an embodiment of an optical multiplexer according to another aspect of the present invention. The optical multiplexer 101B has a structure in which the optical multiplexer 101A shown in FIG. 8 is further cascaded with a optical-circuit stage comprising MZI-type optical circuits at the signal lightwave-entering side. With the optical multiplexer 101B, the travelling direction of the signal lightwave is shown by an arrow in FIG. 12. The left-side end face of the substrate 110 is an input end face 110a; the right-side end face, an output end face 110b.

The optical circuit comprises (a) six optical-circuit sections 111 to 116 each having an MZI-type structure, (b) a Y-junction 120, and (c) an output optical waveguide 117 all placed on the substrate 110. In this optical circuit, the output-side optical circuit portion including the optical-circuit sections 111 and 112, the Y-junction 120, and the output optical waveguide 117 has the same structure as that shown in FIG. 8. In this embodiment, the optical-circuit sections 113 to 116 forming a preceding stage is added to the optical-circuit sections 111 and 112.

Signal lightwaves P1 and P2 entering the respective input ends of the optical-circuit section 113 are combined by an MZI comprising a fifth optical waveguide 141 and a sixth optical waveguide 142, pass through the output end of the sixth optical waveguide 142, and enter a first optical waveguide 121 of the optical-circuit section 111. Similarly, signal lightwaves P3 and P4 entering the respective input ends of the optical-circuit section 114 are combined by an MZI comprising a seventh optical waveguide 143 and an eighth optical waveguide 144, pass through the output end of the seventh optical waveguide 143, and enter a second optical waveguide 122 of the optical-circuit section 111.

Yet similarly, signal lightwaves P5 and P6 entering the respective input ends of the optical-circuit section 115 are combined by an MZI comprising a ninth optical waveguide 145 and a tenth optical waveguide 146, pass through the output end of the tenth optical waveguide 146, and enter a third optical wave guide 131 of the optical-circuit section 112. Yet similarly, signal lightwaves P7 and P8 entering the respective input ends of the optical-circuit section 116 are combined by an MZI comprising an eleventh optical waveguide 147 and a twelfth optical waveguide 148, pass through the output end of the eleventh optical waveguide 147, and enter a fourth optical waveguide 132 of the optical-circuit section 112.

In succession, the signal lightwave P1+P2 emerging from the optical-circuit section 113 and the signal lightwave P3+P4 emerging from the optical-circuit section 114 are further combined in the optical-circuit section 111 by an MZI comprising the first and second optical waveguides 121 and 122, pass through the output end of the second optical waveguide 122, and enter the input side of the Y-junction 120. Similarly, the signal lightwave P5+P6 emerging from the optical-circuit section 115 and the signal lightwave P7+P8 emerging from the optical-circuit section 116 are further combined in the optical-circuit section 112 by an MZI comprising the third and fourth optical waveguides 131 and 132, pass through the output end of the third optical waveguide 131, and enter the input side of the Y-junction 120.

Subsequently, the signal lightwave P1+P2+P3+P4 emerging from the optical-circuit section 111 and the signal lightwave P5+P6+P7+P8 emerging from the optical-circuit section 112 are further combined by the Y-junction 120, and the combined signal lightwave Pout emerges from the output end of the output optical waveguide 117.

As described above, when multiple stages each comprising MZI-type optical circuits are cascaded as a preceding stage to the Y-junction 120, more signal lightwaves (eight signal lightwaves in this embodiment) each having a different wavelength can be combined in comparison with the structure shown in FIG. 8, in which one stage of MZI-type optical circuits is cascaded to the Y-junction. In this multistage structure, also, the effects of the use of the Y-junction such as the miniaturization of the optical circuit are the same as in the optical-circuit structure shown in FIG. 8.

The optical multi/demultiplexer of the present invention is not limited to the above-described embodiments. For example, the optical-path difference in an arm waveguide section in an MZI comprising the first and second optical waveguides is not limited to the foregoing structural examples and conditions. Various structures may be employed in accordance with the specific conditions such as the entire wavelength band for signal transmission and the wavelength spacing.

Furthermore, as for the specific structures for forming MZIs as a preceding stage to be cascaded to the Y-junction, various structures may also be employed in accordance with the specific conditions such as the entire wavelength band and the wavelength spacing of the signal lightwaves to be combined. FIG. 8 shows the optical multiplexer 101A in which both the first and second optical-circuit sections 111 and 112 cascaded as a preceding stage to the Y-junction 120 form MZI-type optical circuits. However, a structure may be employed in which either one of the first and second optical-circuit sections 111 and 112 forms an MZI-type optical circuit. Moreover, in order to combine an increased number of signal lightwaves each having a different wavelength, a structure may be employed in which multiple stages each comprising MZI-type optical circuits are cascaded to the optical circuit of the optical multiplexers 101A and 101B shown in FIGS. 8 and 12.

The entire disclosure of Japanese Patent Applications No. 2002-117966 and No. 2002-118094 both filed on May 29, 2002 including the specification, claims, drawings, and summary is incorporated herein by reference in its entirety.

What is claimed is:

1. An optical multi/demultiplexer comprising a substrate and an optical circuit formed on the substrate;
    the optical circuit comprising (a) a circuit having a wavelength dependency and (b) a Y-junction, wherein:
    the circuit having a wavelength dependency is a Mach-Zehnder interferometer (hereinafter referred to as an MZI);
    the MZI comprises:
        at least two directional couplers;
        a first optical waveguide; and
        a second optical waveguide which is optically coupled with the first optical waveguide through the at least two directional couplers; the MZI has at least one arm waveguide section, said at least one arm waveguide section represents the waveguide section composed of the first and second optical waveguides lying between adjacent directional couplers and has different optical paths;
    the at least three directional couplers are a first directional coupler, a second directional coupler, and a third directional coupler provided in this order from the first and second input/output ends toward the Y-junction;
    a second arm waveguide section represents the waveguide section composed of the first and second optical waveguides lying between the second directional coupler and the third directional coupler; and
    an optical-path difference, $\Delta L2$, in the second arm waveguide section has a magnitude of $\lambda/1.45$ or less, where $\lambda$ is one of the wavelengths in the en-tire wavelength band for signal transmission.

2. An optical multi/demultiplexer comprising a substrate and an optical circuit formed on the substrate;
    the optical circuit comprising (a) a circuit having a wavelength dependency and (b) a Y-junction, wherein;
    the circuit having a wavelength dependency is a Mach-Zehnder interferometer (hereinafter referred to as an MZI):
    the MZI comprises:
        at least two directional couplers;
        a first optical waveguide; and
        a second optical waveguide which is optically coupled with the first optical waveguide through the at least two directional couplers; the MZI has at least one arm waveguide section, said at least one arm waveguide section represents the waveguide section composed of the first and second optical waveguides lying between adjacent directional couplers and has different optical paths;
    the at least three directional couplers are a first directional coupler, a second directional coupler, and a third directional coupler provided in this order from the first and second input/output ends toward the Y-junction;
    a first arm waveguide section represents the waveguide section composed of the first and second optical waveguides lying between the first directional coupler and the second directional coupler;
    an optical-path difference, $\Delta L1$, in the first arm waveguide section has a magnitude of $8.62\ (\mu m^{-1}) \times \lambda^2$ or more and not more than $137.93\ (\mu m^{-1}) \times \lambda^2$, where $\lambda$ is one of the wavelengths in the entire wavelength band for signal transmission;
    a third arm waveguide section represents the waveguide section composed of the first and second optical waveguides lying between the third directional coupler and the Y-junction; and
    an optical-path difference, $\Delta L3$, in the third arm waveguide section has a magnitude of $4.31\ (\mu m^{-1}) \times \lambda^2$ or more and not more than $68.97\ (\mu m^{-1}) \times \lambda^2$, where $\lambda$ represents the same as before.

3. An optical multi/demultiplexer as defined by claim 1, wherein:
    the optical circuit further comprises at least one cascaded optical-circuit stage comprising at least one optical circuit; and
    the or each optical circuit in the or each optical-circuit stage comprises:
        at least three directional couplers;
        a first optical waveguide whose one end is a first input/output end;
        a second optical waveguide whose one end is a second input/output end and which is optically coupled with the first optical waveguide through the at least three directional couplers;
        a third optical waveguide whose one end is a third input/output end; and
        a Y-junction that is connected to other components such that:
            its one side is connected to both the other end of the first optical waveguide and the other end of the second optical waveguide; and
            its other side is connected to the other end of the third optical waveguide.

4. An optical multi/demultiplexer comprising a substrate and an optical circuit formed on the substrate:
    the optical circuit comprising (a) a circuit having a wavelength dependency and (b) a Y-junction, wherein:
    the circuit having a wavelength dependency is a Mach-Zehnder interferometer (hereinafter referred to as an MZI);
    the MZI comprises:
        at least two directional couplers;
        a first optical waveguide; and
        a second optical waveguide which is optically coupled with the first optical waveguide through the at least two directional couplers; the MZI has at least one arm waveguide section, said at least one arm waveguide section represents the waveguide section composed of the first and second optical waveguides lying between adjacent directional couplers and has different optical paths;
    one end of the first optical waveguide is a first input end; and one end of the second optical waveguide is a second input end;
    the MZI forms a first optical-circuit section;
    the optical circuit further comprises:
    a second optical-circuit section comprising a third optical waveguide whose one end is a third input end; and
    an output optical waveguide whose one end is an output end; and
    the Y-junction is connected to other components such that:
    its one side is connected to both the other end of the first or second optical wave guide and the other end of the third optical waveguide; and its other side is connected to the other end of the output optical waveguide;

the second optical-circuit section further comprises:
- at least two directional couplers; and
- a fourth optical waveguide whose one end is a fourth input end and which is optically coupled with the third optical waveguide through the at least two directional couplers; and the third optical waveguide, the fourth optical waveguide, and the at least two directional couplers constitute another MZI.

5. An optical multi/demultiplexer comprising a substrate and an optical circuit formed on the substrate;

the optical circuit comprising (a) a circuit having a wavelength dependency and (b) a Y-junction, wherein:

the circuit having a wavelength dependency is a Mach-Zehnder interferometer (hereinafter referred to as an MZI);

the MZI comprises:
- at least two directional couplers;
- a first optical waveguide; and
- a second optical waveguide which is optically coupled with the first optical waveguide through the at least two directional couplers; the MZI has at least one arm waveguide section, said at least one arm waveguide section represents the waveguide section composed of the first and second optical waveguides lying between adjacent directional couplers and has different optical paths;

one end of the first optical waveguide is a first input end; and one end of the second optical waveguide is a second input end;

the MZI forms a first optical-circuit section;

the optical circuit further comprises:
- a second optical-circuit section comprising a third optical waveguide whose one end is a third input end; and
- an output optical waveguide whose one end is an output end; and the Y-junction is connected to other components such that:

its one side is connected to both the other end of the first or second optical waveguide and the other end of the third optical waveguide; and its other side is connected to the other end of the output optical waveguide;

the optical circuit further comprises a third optical-circuit section comprising:
- at least two directional couplers;
- a fifth optical waveguide whose one end is a fifth input end; and
- a sixth optical waveguide whose one end is a sixth input end and which is optically coupled with the fifth optical waveguide through the at least two directional couplers;

the fifth optical waveguide, the sixth optical waveguide, and the at least two directional couplers constitute yet another MZI; and the third optical-circuit section is connected to at least one of the first in-put end and the second input end.

* * * * *